March 16, 1937.   P. K. SAUNDERS   2,074,240
DIAPHRAGM VALVE
Filed Aug. 22, 1935   3 Sheets-Sheet 1
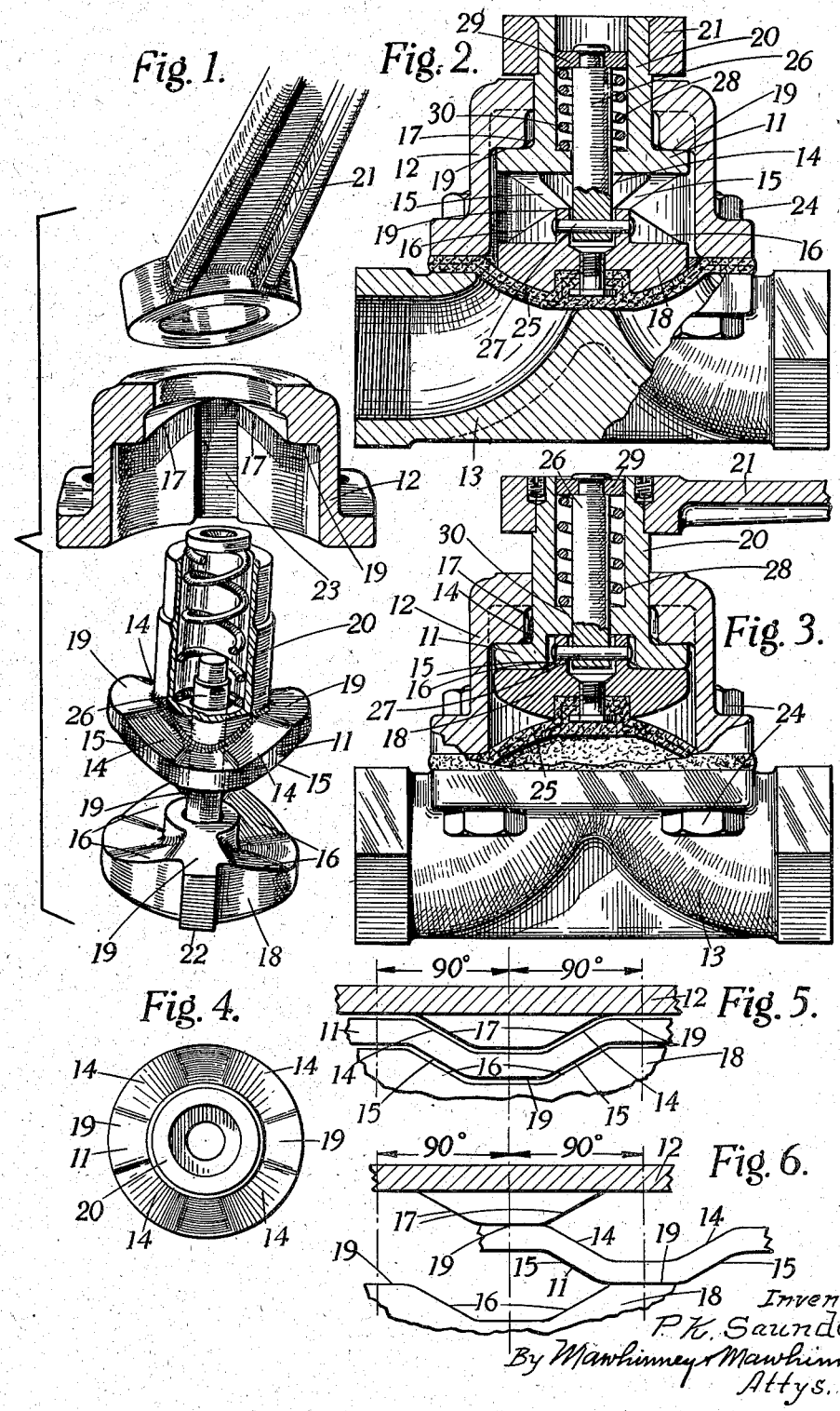

March 16, 1937. P. K. SAUNDERS 2,074,240
DIAPHRAGM VALVE
Filed Aug. 22, 1935 3 Sheets-Sheet 2
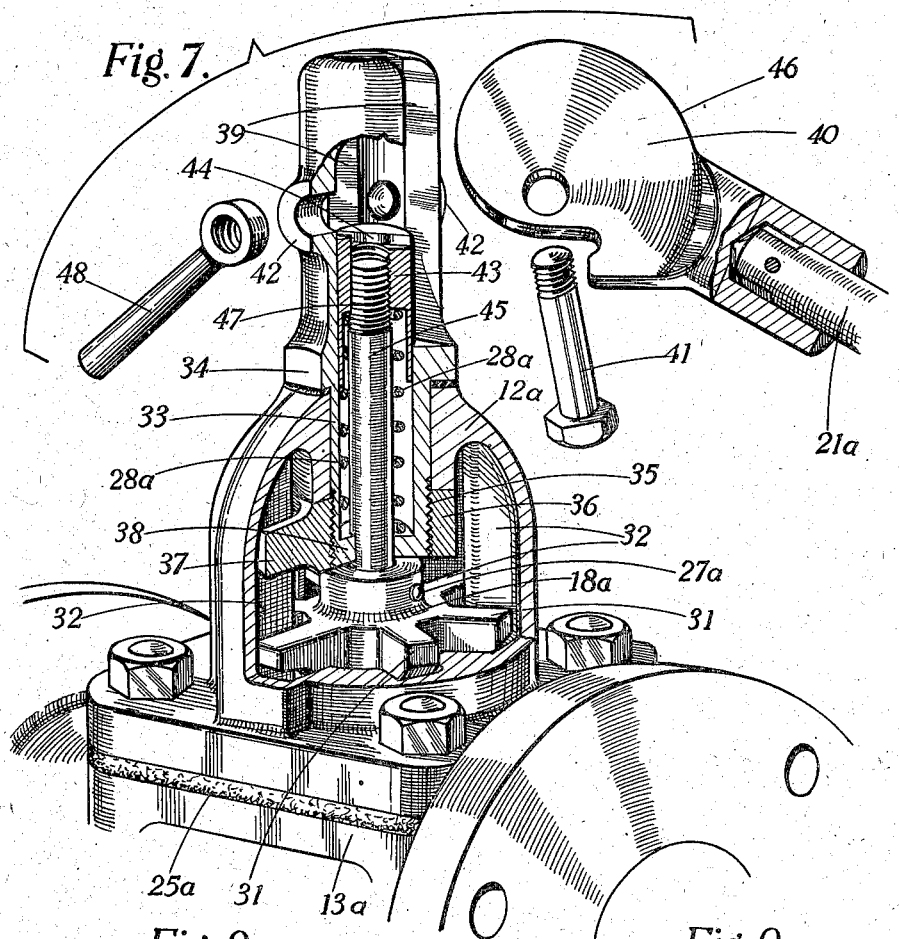
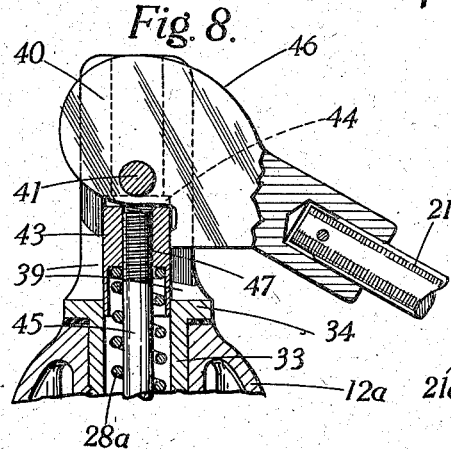
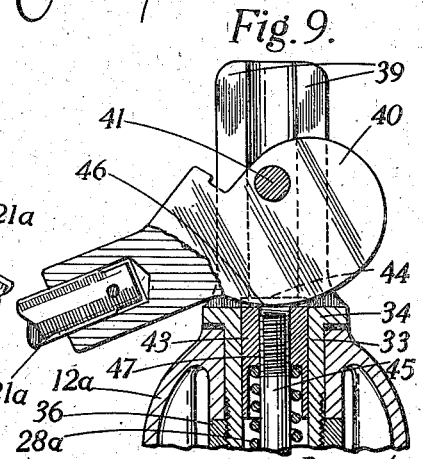
Inventor:
P. K. Saunders,
By Mawhinney & Mawhinney
Attys.

March 16, 1937. P. K. SAUNDERS 2,074,240
DIAPHRAGM VALVE
Filed Aug. 22, 1935 3 Sheets-Sheet 3

Inventor:
P. K. Saunders,
By Mawhinney & Mawhinney
Attys.

Patented Mar. 16, 1937

2,074,240

UNITED STATES PATENT OFFICE 2,074,240

DIAPHRAGM VALVE

Philip Keith Saunders, Wolverhampton, England, assignor to Saunders Inventions Limited, Johannesburg, Union of South Africa Application August 22, 1935, Serial No. 37,387
In Great Britain August 23, 1934

3 Claims. (Cl. 251—89)

Diaphragm valves have numerous advantages over the plug-cock type of valve, but one advantage that the latter has over the former in ordinary conditions is that it can be quickly moved from the fully-open to the fully-closed position, whereas normally a number of turns of an actuating spindle is necessary for effecting the corresponding operation of a diaphragm valve. Furthermore, when a plug-cock is not provided with any stop the actuating handle can be moved beyond the fully-closed position without any damage being done; but excessive pressure applied to the actuating means of a diaphragm valve, for closing it, will cause damage to the valve, particularly in the case of a small diaphragm valve.

The present invention particularly relates to "streamline" diaphragm valves—that is, to the kind where the body has a substantially straight-through passage intersected by a shallow barrier extending across the passage and having a concave face which forms a seating for the diaphragm, the base wall of the passage curving up smoothly to the concave face on each side of the barrier.

The main object of the present invention is to provide improvements in diaphragm valves by which the above-mentioned drawbacks of diaphragm valves will be remedied.

A further object of the invention is to provide a quick-acting actuating mechanism which can be embodied in a diaphragm valve of standard construction with substantially no alteration to the valve except for the replacement of parts of the actuating mechanism.

Broadly speaking, the invention comprises a toggle, cam or equivalent actuating mechanism for a diaphragm valve whereby the diaphragm can be quickly moved from the fully-open to the fully-closed position, for example, by turning an actuating member through less than one complete revolution, and held in the closed position. Preferably the mechanism is such as to be irreversible by the fluid pressure acting on the diaphragm, when the latter is closed. For example, a toggle slightly overset against a stop is irreversible by the fluid pressure.

According to a further feature of the invention, an eccentric or other cam of a quick-acting pattern, for operating the diaphragm, has a portion of its operative contour such that the diaphragm will be held in the fully-closed position for different positions of the cam.

According to a further feature of the present invention, the diphragm of a diaphragm valve is operated by a toggle, quick-acting cam or equivalent means providing a varying leverage and adapted to hold the diaphragm in the fully-closed position.

The invention further consists in a diaphragm valve where the diaphragm is actuated in the closing direction against spring pressure by a quick-acting cam rotatable about an axis transverse to that of the diaphragm.

According to a further feature of the invention, the actuating mechanism of a diaphragm valve includes a bush supporting a rotatable cam which engages a stem movable axially of the bush.

A further feature of the invention includes a quick-acting rotatable cam connected with an axially-movable stem, for opening and closing the valve, so as positively to move the stem in both directions.

According to a further feature of the invention, the diaphragm of a diaphragm valve is actuated through a plurality of "easy-faced" cam or equivalent devices arranged in series, i. e., acting one through another.

According to a still further feature of the invention, the diaphragm of a diaphragm valve is actuated through an intermediate member formed on opposite faces with "easy" cams co-acting, respectively, with equivalent cams on the valve body, or on a cover therefor, and on an actuator for the diaphragm; the cams having flats adapted for holding the actuator with the diaphragm in the closed position.

In the accompanying drawings:—

Figure 1 is a perspective "exploded" view of one form of actuating mechanism, according to the invention, suitable for a relatively small valve;

Figure 2 is a part-sectional elevation of a valve fitted with the actuating mechanism of Figure 1, the valve being shown closed;

Figure 3 is a substantially similar view of the valve when open;

Figure 4 is a plan of the intermediate member;

Figures 5 and 6 are diagrams illustrating the position of the intermediate member relative to the cover and actuator when the valve is closed and open, respectively;

Figure 7 is a part-sectional perspective view, with the handle and cam shown detached, of another form of actuating mechanism according to the invention, which is suitable for a larger valve;

Figures 8 and 9 are fragmentary sectional views showing the cam when the valve is open and closed, respectively;

Figure 10:
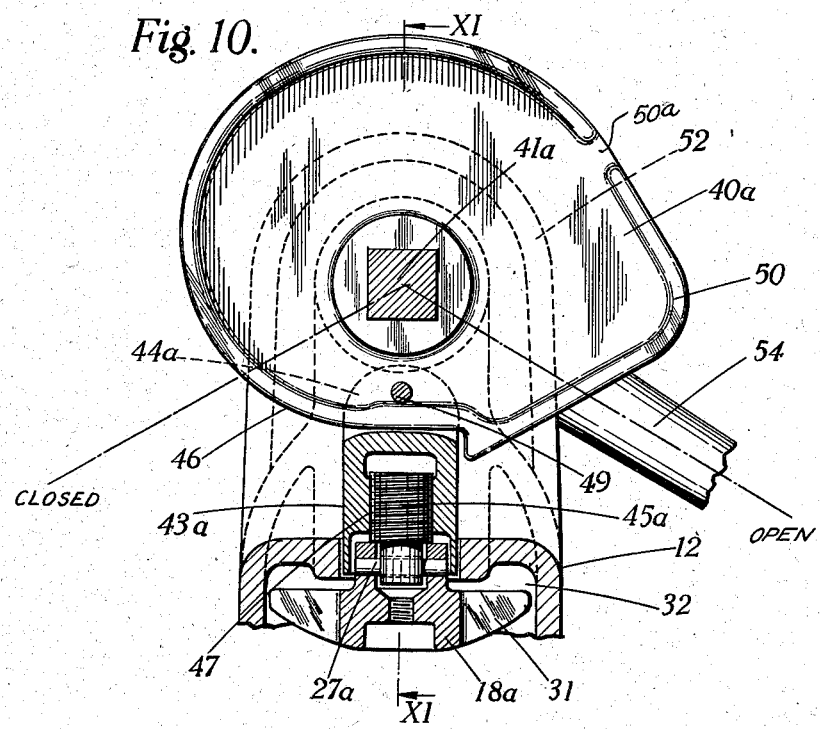
Figure 10 is an enlarged sectional elevation showing a modified form of cam and tappet, for use instead of that of Figures 7 and 9.

In the construction of Figures 1 to 6, which is eminently suitable for relatively small "streamline" diaphragm valves and with which the overall dimensions of the valve are not materially increased, use is made of the intermediate member aforesaid. This is an annulus 11 disposed within a cylindrical portion of the cover 12 for the valve body 13. On each of its opposite faces are provided two diametrically-opposite rising cams with smooth, inclined surfaces 14, 14 and 15, 15. Corresponding diametrically-opposite inclined cam surfaces 16 and 17 are provided on the adjacent surfaces of an actuator 18 for the diaphragm and of the far end of the cover, respectively. The extremities of all the cam surfaces are flattened, as shown at 19. The intermediate member is, in fact, like a wavy ring with a central axial flange 20. The cams on one surface are in series with those on the opposite surface.

In the open position of the valve (Figure 3) the inclined cam surfaces 15, 14, on the intermediate member rest against the corresponding inclinations 16, 17 on the actuator and the cover, respectively, as shown in Figure 5, when the actuator is as near that end of the cover as possible. On twisting the intermediate member—as by means of a handle 21 fast on the shank portion 20 of the member—it is itself forced axially away from the adjacent end of the cover and at the same time the actuator is forced axially away from the intermediate member, as the various inclined surfaces ride up one another—the actuator being slidably guided and held against rotation in the cover by means of the lugs 22 sliding in the grooves 23 of the cover. When the parts have been fully expanded in this manner the appropriate cam flats 19 are in engagement and the actuator is thus held in this position, in which the diaphragm is fully closed, as shown by Figures 2 and 5.

The axial distance between the flats 19 of the cams on the opposite faces of the intermediate member must be accurately arranged to ensure that the diaphragm will be fully closed in the above conditions. Fine adjustment can be effected by tightening the nuts or screws 24 by which the cover clamps the diaphragm 25 against the valve body.

Conveniently, the shank 20 of the intermediate member is bored freely to receive a spindle 26 pinned at 27 or otherwise connected to the adjacent face of the actuator. A compression spring 28 may be interposed between a head 29 on this spindle and an inturned flange 30 of the intermediate member, so that at all times the actuator will be biased towards the intermediate member.

The inclinations of the cam surfaces are sufficiently "easy" to allow of operation in this manner from the fully-open to the fully-closed position when the intermediate member is turned through approximately one quarter revolution. If the latter be turned further than the fullclosing position, as it can be, no damage will be done to the diaphragm but the valve will just be re-operated towards the open position. Closing can be effected by rotation of the intermediate member in either direction. The fully-closed position of the diaphragm is maintained, in this construction, for a handle movement of over 30°—in point of fact, for a movement of about 90°.

For larger sizes of "streamline" diaphragm valves an operating mechanism with even less friction is, in ordinary conditions, desirable; and in the constructions of Figures 7 to 11 and particularly in that of Figures 7 to 9 the diaphragm 25a (clamped against the body 13a which is substantially similar to the body 13 of the valve of Figures 1 to 3) is forced in the closing direction by means of an actuator 18a formed with arms 31 which serve for the support of the flexible portion of the diaphragm when the valve is closed. The arms are arranged to co-act with grooves 32 formed in the cover 12a of the valve, the lower edges (not visible in the drawings) of the walls defining the grooves constituting supports for the flexible portion of the diaphragm when this is fully opened. In the present instance use is made of a bush 33 entered through the opening at the upper end of the cover 12a of the valve. The bush carries a flange 34 by which its inward movement is limited and it is externally screw-threaded at the lower end 35 to take into a nut 36 placed in the interior of the cover. During the screwing of the bush into the nut the latter can be prevented from rotation if formed with an arm 37 engaging one of the grooves 32 of the cover. At its lower end the bush is provided with a short inturned flange 38 which supports the lower end of a compression spring 28a. It may, in addition, provide a stop to limit the outward movement of the actuator, as shown in Figure 7.

As thus described the cover and actuator may be identical with those of a known form of "streamline" diaphragm valve, though the bush, which is usually rotatable, is replaced by the present bush which is held in the cover against movement.

In the present instance the bush is continued well up beyond the top of the cover, and longitudial slots 39 diametrically opposite one another are formed in its open end which is thus forked. Interposed in these slots is a cam 40 in the form of an eccentric disc, this being pivotally supported from the bush by means of a cross pin 41. The bush may be formed with bosses 42 to receive this. The lower edge of the cam engages a tappet 43 which is conveniently provided with ears 44 disposed one on each side of the cam. The tappet is connected by a thrust rod 45 with the actuator 18a, this preferably being hinged to the rod as shown at 27a. The compression spring 28a bears against the underside of the tappet. Extending from the periphery of the cam is an actuating handle 21a.

The contour of the cam is such that when the handle is turned from the fully-open towards the fully-closed position, the first portion of the movement effects a relatively rapid closing of the diaphragm, when the resistance is relatively light, but the next portion of the movement effects a slower movement of the diaphragm as it is being forced against the resistance into its fully-closed position. During the final movement of the handle a concentric portion 46 of the cam co-acts with the tappet so that the diaphragm will be held closed against any opening pressure applied by the fluid controlled by the valve. In this way it is possible by turning the handle through a distance just greater than 180° to move the diaphragm rapidly, and with ease, from the fully-open to the fully-closed position, or vice versa, even in the case of a very large diaphragm valve.

The tappet may be adjustably mounted upon the thrust rod, as shown at 47, and in this case adjustment of the valve can be effected by means of the tappet.

In some cases it may be desirable for the diaphragm valve to be maintained in a partly-open position, and a convenient method of arranging for this consists in using a bolt as the pivot pin 41 for the cam, the bolt carrying on its free end a wing nut 48 which can be tightened to clamp the cam in a set position between the two jaws of the forked end of the bush.

Only a light compression spring need be used for returning the compressor to the fully-open position when the cam has been appropriately turned, as the opening movement of the diaphragm is assisted by the pressure of the fluid controlled by the valve. Obviously if the pressure of this is relatively low a stronger spring may be used.

Figure 11:
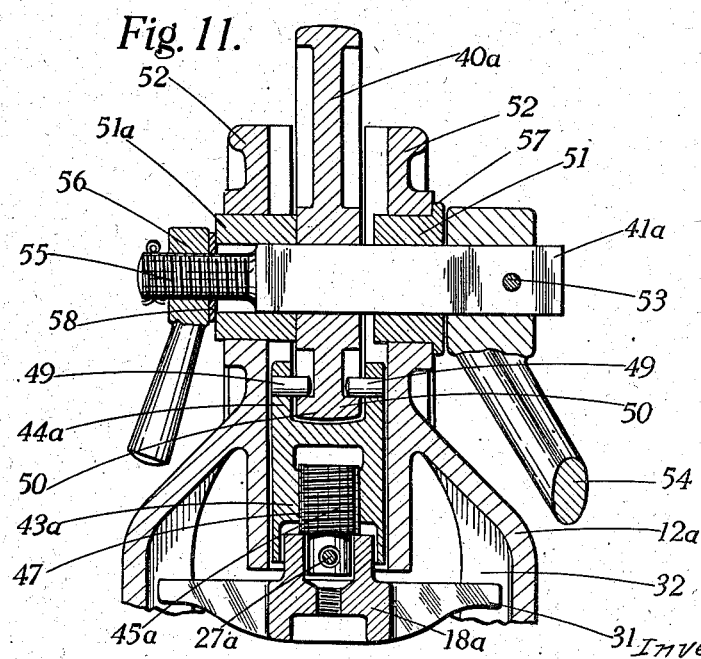
Figure 11 is a cross-section taken on the line XI—XI of Figure 10, this figure indicating also an alternative method of clamping the cam in a selected position.

In some cases the use of a return spring such as that marked 28a in Figures 7 to 9 is disadvantageous, and in the modification indicated by Figures 10 and 11 no such spring is used. Here the ears 44a of the tappet 43a, which have a screw-threaded connection at 47 with a thrust rod 45a pinned at 27a to the compressor 18a, are formed with inwardly-extending pins 49 which engage peripheral flanges 50 formed on the cam 40a. In this event the tappet is positively pulled open or pushed down according to the direction in which the cam 40a is turned.

Furthermore, in this modification the cam 40a is slidably mounted upon the cross pin 41a which is of non-circular section, taking into corresponding holes in the bushes 51, 51a which are rotatively journalled in holes provided in the ears 52. These ears are in this case formed integrally with the cover 12a. Pinned at 53 to one end of the cross pin 41a is the actuating handle 54. The other end of the cross pin has a screw-thread 55 receiving the wing nut 56.

It will be observed that the bush 51 is provided with a shoulder 57 locating it against axial movement to the left (Figure 11) and that the bush 51a has no such flange but is instead directly engaged by the wing nut 56 through a washer 58. When the cam (and therefore the tappet of the valve) is to be held in some intermediate position the nut 56 can be screwed down the thread 55. After any clearance between the bush 51 and the adjacent surface of the handle 54 has been taken up on axial movement of the cross pin 41a, the further rotation of the nut 56 forces the bush 51a axially to the right (Figure 11) to clamp the cam 40a against the surface of the adjacent ear 52. In this way it can be frictionally held against rotation.

This second kind of quick-acting valve (of Figures 7 to 11) is very suitable for controlling the fluid pressure for use in the operation of many mine or pit cages. For example, when the cage is nearing the bottom the operator turns the handle, say, through two-thirds of its travel and in this movement closes the valve to the extent of about 92%. As the remaining one-third of the handle travel has, in this assumed case, only to control 8% of the diaphragm movement, very accurate regulation can be obtained, thus facilitating bringing the cage quickly and safely to rest.

Thus, by means of the invention a diaphragm valve can be moved from the fully-closed to the fully-open position, and vice versa, very quickly and easily, and held in the closed position.

What I claim as my invention and desire to secure by Letters Patent of the United States is:—

1. Actuating mechanism for a diaphragm valve, including an axially-movable stem for opening and closing the valve, a quick-acting rotatable cam, and means interconnecting said cam and stem whereby said stem is positively movable in both directions on appropriate operation of said cam, said means including a flanged rim on the cam and means carried by said stem engaging opposite sides of said flanged rim, and said flanged rim having a portion removed to allow of assembly.

2. A diaphragm valve comprising a diaphragm, a body with a substantially straight-through passage, a shallow barrier extending partly across said passage, said barrier having a concave face which forms a seating for a diameter of the diaphragm, the base wall of said passage curving up smoothly to the concave face on each side of the barrier, spaced fingers carried by the body for supporting the main portion of said diaphragm when fully opened, and actuating means for the diaphragm including a compressor connected to the diaphragm, said compressor having fingers adapted to pass between those of said body, an axially-movable stem connected to the compressor, and a quick-acting cam associated with said stem whereby the diaphragm can be moved from the fully-open to the fully-closed position by movement of the cam through an angle of less than 360°, said cam having its operative surface shaped so that the rate of movement of the diaphragm when the cam is turned at a uniform speed to close the diaphragm is a maximum at the beginning, when the pressure of the compressor on the diaphragm is a minimum, the diaphragm then being partially supported by the fingers carried by the body, the rate of movement of the diaphragm thereafter decreasing to a minimum as the diaphragm is nearly closed when the pressure exerted by the compressor on the diaphragm becomes a maximum.

3. A diaphragm valve comprising a body having a pair of outwardly-extending ears, an axially-movable stem for actuating the diaphragm, and a quick-acting rotatable cam coacting with said stem, the support for said cam comprising a cross pin of non-circular section on which said cam is slidably mounted, bushes rotatably mounted in said ears and adapted slidably to receive said cross pin, one end of said cross pin being screw-threaded to receive a nut engaging the adjacent end of one of said bushes, said one bush being slidably mounted in one of said ears, and means for limiting the axial movement of said cross pin in one direction when said nut is tightened on said cross pin, whereby said nut on being tightened on said cross pin will effect axial movement of said one bush to clamp said cam against one of said ears.

PHILIP KEITH SAUNDERS.